United States Patent [19]

Stumpf, Jr.

[11] Patent Number: 4,723,756
[45] Date of Patent: Feb. 9, 1988

[54] PORTABLE MOTORCYCLE STAND AND LIFT

[76] Inventor: Charles W. Stumpf, Jr., 3530 Manchester Dr., Bettendorf, Iowa 52722

[21] Appl. No.: 851,719

[22] Filed: Apr. 14, 1986

[51] Int. Cl.⁴ .............................................. B66F 5/04
[52] U.S. Cl. .................................. 254/93 H; 254/134
[58] Field of Search ............... 254/2 R, 93 R, 93 HP, 254/93 L, 133 R, 134; 108/147; 414/11; 211/208, 93 M

[56] References Cited

U.S. PATENT DOCUMENTS

| | | | |
|---|---|---|---|
| 1,981,680 | 11/1934 | Tindale | 108/147 X |
| 2,935,210 | 5/1960 | Cohen | 211/208 X |
| 2,998,960 | 9/1961 | Smith | 254/2 R |
| 3,049,243 | 8/1962 | Buice | 414/11 |
| 4,331,324 | 5/1982 | Andary | 254/2 R |
| 4,420,164 | 12/1983 | Mitchell | 254/134 X |

Primary Examiner—Robert C. Watson
Attorney, Agent, or Firm—Robert O. Richardson

[57] ABSTRACT

This invention relates to a portable motorcycle stand and lift which permits a single operator to lift a motorcycle unassisted. After actuating a hoisting means to lift the motorcycle to its desired height, pins are used as locking means to immobilize the relatively movable frame members.

2 Claims, 4 Drawing Figures

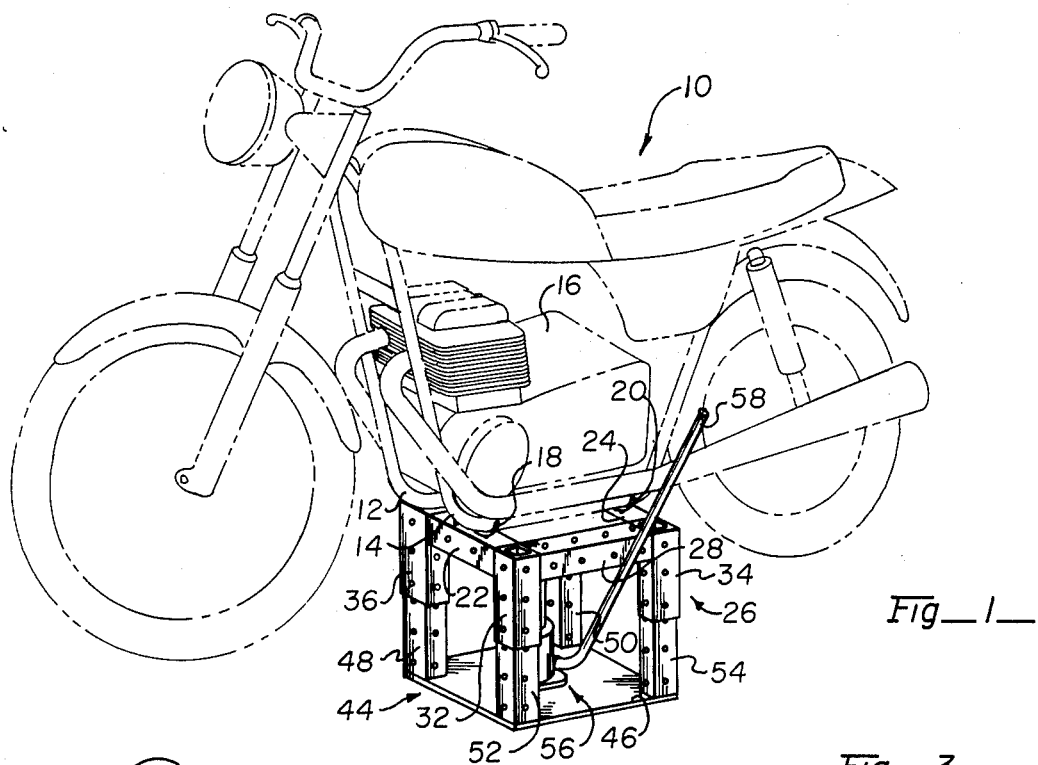
Fig—1
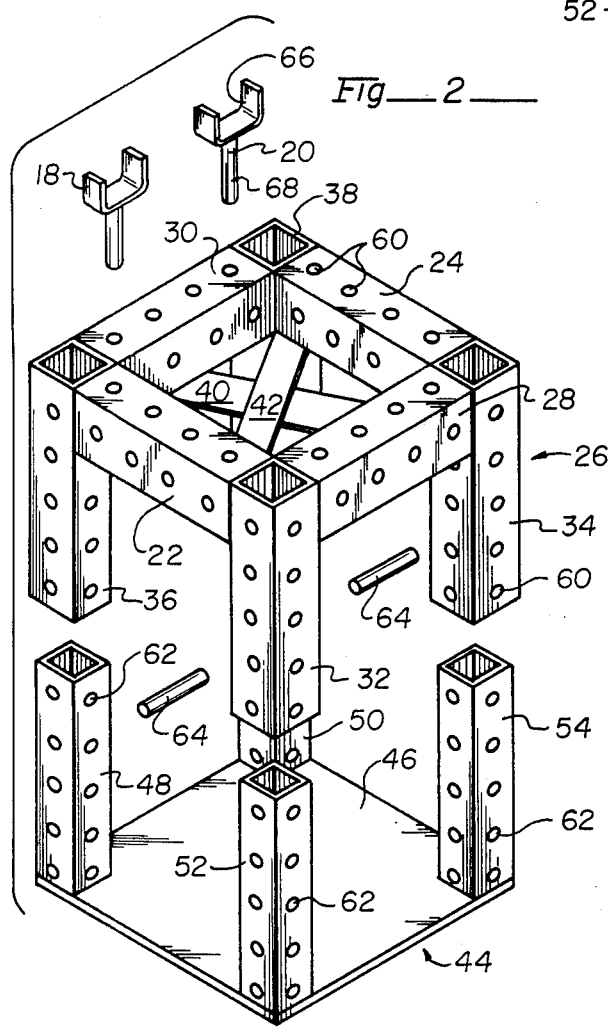
Fig—2
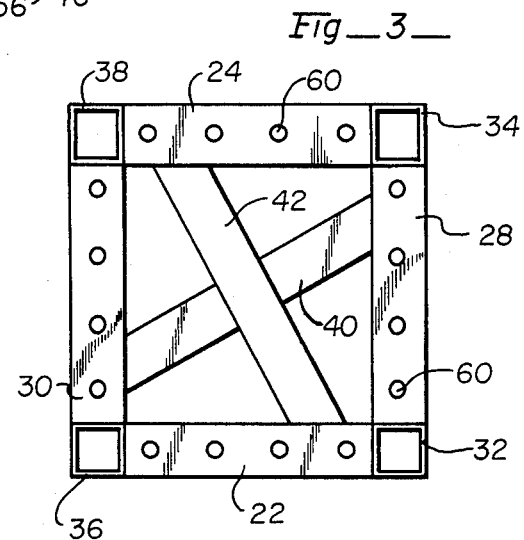
Fig—3
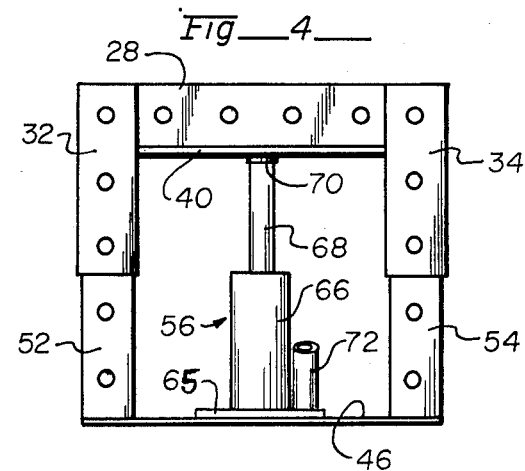
Fig—4

PORTABLE MOTORCYCLE STAND AND LIFT

FIELD OF INVENTION

This invention relates to a portable motorcycle stand and lift which permits a single operator to lift a motorcycle unassisted. After actuating a hoisting means to lift the motorcycle to its desired height, pins are used as locking means to immobilize the relatively movable frame members.

BACKGROUND OF THE INVENTION

Many motorcycle owners like to maintain, service and repair their own motorcycles instead of having the work done at commercial service and repair shops or motorcycle dealer service departments. These latter places have lifting devices for raising the motorcycles off the ground and to a height that is comfortable for the mechanic to perform the needed service. However, these lifting devices are unsuitable for the motorcycle owner or "backyard mechanic" to use. They are expensive, heavy and are permanently installed in a service building. They are not portable. They usually require the attention of more than one person in their operation.

In the past when a motorcycle owner wished to service or repair his own motorcycle, he usually arranges boxes, tables or benches upon which his motorcycle is to be placed. Then, because of the bulk and weight of his motorcycle, he must recruit the help of his neighbors and friends in lifting his motorcycle onto the makeshift stand. Obviously this can be an inconvenience, especially if assistance is not available.

SUMMARY OF PRESENT INVENTION

In accordance with the principles of the present invention a portable motorcycle stand and lift has been devised whereby the operator can hold and lift a motorcycle unassisted. The lift is small, light and compact, and may be stored easily when not in use. It is rugged and strong yet simple and inexpensive to make. Its simplicity of operation is self evident.

Briefly the lift comprises a base and an upper support. The base has upwardly extending legs which fit telescopically with downwardly extending legs on the upper support. A hydraulic jack rests on the base with its piston head engaging cross-members on the upper support. The jack has a handle of such length and configuration that an operator can hold the motorcycle steady with one hand while he raises it and the upper support with the other. Motorcycle frame engaging yokes are adjustably positioned on the upper support to accommodate various types and sizes of motorcycle frames. A plurality of openings in the telescoping legs, when aligned, receive pins to hold the upper support at the desired elevation.

BRIEF DESCRIPTION OF THE DRAWINGS

FIG. 1 is a perspective view of the lift assembly in raised position with a motorcycle shown in phantom lines positioned thereon, FIG. 2 is an exploded view in perspective of the lift assembly without a lifting mechanism, FIG. 3 is a plan view of the lift, and FIG. 4 is an elevation view.

DETAILED DESCRIPTION OF PREFERRED EMBODIMENT

Referring now to FIG. 1 there is shown in phantom lines a typical two wheeled motorcycle 10 having a pair of engine support members 12, 14 extending fore and aft under the motorcycle engine 16 and comprising that portion of the motorcycle frame. Support member 14 is cradled in a pair of yokes 18, 20. Support member 12 is cradled in a similar pair not shown. These yokes are adjustably positioned on crossmembers 22, 24 of upper support 26 which comprises the upper vertically movable portion of the lift.

In addition to crossmembers 22, 24, upper support 26 includes side members 28 and 30 (shown in FIG. 2) and downwardly extending tubular legs 32, 34, 36 and 38 (shown in FIG. 2). Cross bars 40, 42, the intersection of which is over and is contacted by the jack piston head as shown in FIG. 4, completes the upper support 26.

The base 44 or lower portion of the lift includes a plate 46 having upwardly extending legs 48, 50, 52 and 54 at its corners. These legs meet with and telescope with the upper support downwardly extending legs 32, 24, 36 and 38. A hydraulic jack 56 is positioned on the base plate 46 and under the cross bars 40, 42 on the upper support 26. The jack handle 58 is of such length and configuration that the operator can steady the motorcycle 10 with one hand and raise it by pumping the jack handle with the other.

Reference is now made to the several views in FIGS. 2, 3 and 4. The upper support 26 includes side members 28, 30 and crossmembers 22, 24 connected, such as by welding, to the upper ends of the downwardly extending legs 32, 34, 36 and 38. As shown, all of these are made from square tubing having uniformly spaced perforations 60 on all four sides. The upwardly extending legs 48, 50, 52 and 54 on base plate 46 are of smaller size so that they may be telescoped into the larger upper support legs. However, the perforations 62 in the lower legs are of the same size and spacing as the perforations 60 in the upper legs so that they may be aligned for insertion of locking pins 64 when the desired height is reached. Yokes 18 and 20 have an upper cradle 66 to receive the motorcycle support members, and a stem 68 which fits into the perforations 60 on the top and bottom walls of the crossmembers 22, 24. The cross bars 40, 42 are strips of a rectangular thickness, although they also may be of L-shaped cross section or of square tubular construction, similar to that of the side members and crossmembers. For extra strength and rigidity cross bar 42 is attached to side members 28, 30. They are also attached to each other at their intersection.

If the owner has another lifting capability, such as a chain hoist on a tree limb for example, the upper support may be manually lifted to the desired height before placing the motorcycle on to it. In such case the structure shown in FIG. 2 is sufficient without its own lifting device. However, for the lift to be a complete unit, the hydraulic jack 56 shown in FIG. 4 may be used. Such a jack consists of a platform 65, cylinder 66, piston 68 with head 70, and a handle actuator 72. As is well known, by pumping with the handle (not shown in FIG. 4) the piston 68 extends upwardly, lifting any object that is on the piston head 70.

Obviously, after having learned of the foregoing preferred embodiment one skilled in the art will develop modifications, alterations and improvements. It is to be understood that such variations are to be considered as part of my invention as set forth in the following claims.

What is claimed is:

1. A portable motorcycle stand and lift comprising a base having upstanding legs, and upper support having downwardly extending legs, said downwardly extending legs being hollow to receive said upstanding legs therein, alignable openings in said legs to receive pins therein to maintain said legs in predetermined relative position, thereby positioning said upper support a predetermined height above said base, said upper support having cross members intersecting in the middle thereof; lifting means having a platform on said base and an expansible member contacting the underside of the intersection of said cross members to raise said upper support to a predetermined height, and yokes laterally adjustable across said upper support engageable with and retaining engine support members of a motorcycle to be lifted.

2. A portable motorcycle stand and lift as in claim 1 wherein said yokes are of substantial Y-shaped configuration with its lower leg insertable into selected laterally spaced openings in said upper support.

* * * * *